(12) United States Patent
Morgan, III

(10) Patent No.: US 6,488,381 B2
(45) Date of Patent: Dec. 3, 2002

(54) TELESCOPIC AIMING ENHANCER

(76) Inventor: John E. Morgan, III, 4243 Villa Dr., Apt. 503, Little River, SC (US) 29566

( * ) Notice: Subject to any disclaimer, the term of this patent is extended or adjusted under 35 U.S.C. 154(b) by 0 days.

(21) Appl. No.: 09/757,608

(22) Filed: Jan. 11, 2001

(65) Prior Publication Data

US 2002/0089752 A1 Jul. 11, 2002

(51) Int. Cl.$^7$ .................. G02B 21/00; G02B 23/16
(52) U.S. Cl. .................. 359/611; 359/511; 359/600; 359/612
(58) Field of Search .................. 359/399, 407, 359/402, 409, 507–508, 511–513, 600, 614; 42/90, 129, 101; 33/244–253

(56) References Cited

U.S. PATENT DOCUMENTS

| | | | |
|---|---|---|---|
| 2,696,672 A | 12/1954 | Durfee | 33/244 |
| 2,968,099 A | 1/1961 | Peters, Jr. | 33/244 |
| 3,131,477 A * | 5/1964 | Thomas | 359/511 |
| 3,426,433 A * | 2/1969 | Anderson | 33/245 |
| 3,496,642 A | 2/1970 | Pfabler | 33/244 |
| 3,642,345 A * | 2/1972 | Akin, Jr. et al. | 359/611 |
| D234,539 S | 3/1975 | Marchetti | D57/1 E |
| 4,089,117 A | 5/1978 | Villarreal | 33/244 |
| 4,264,123 A | 4/1981 | Mabie | 350/57 |
| 4,926,560 A | 5/1990 | Kilgore et al. | 33/244 |
| 5,020,894 A * | 6/1991 | Weyrauch et al. | 359/600 |
| 5,506,727 A | 4/1996 | Douglas et al. | 359/600 |
| 5,561,563 A * | 10/1996 | Chesnut et al. | 359/823 |
| 5,566,490 A | 10/1996 | Owen | 42/90 |
| 6,000,667 A | 12/1999 | Isbell et al. | 248/201 |

FOREIGN PATENT DOCUMENTS

AT 101242 * 10/1925 ............. 359/611

* cited by examiner

Primary Examiner—Thong Nguyen
(74) Attorney, Agent, or Firm—Keil & Weinkauf

(57) ABSTRACT

The invention is a single device comprised of both an eye enhancer cover and a shade collector the two being connected to each other by two or more elastic band fasteners so it can be removably mounted on a sighting telescopic sight and can be easily stored when not in use. The object of the device is to optimize sighting of a target area under adverse lighting conditions with a single device.

6 Claims, 4 Drawing Sheets

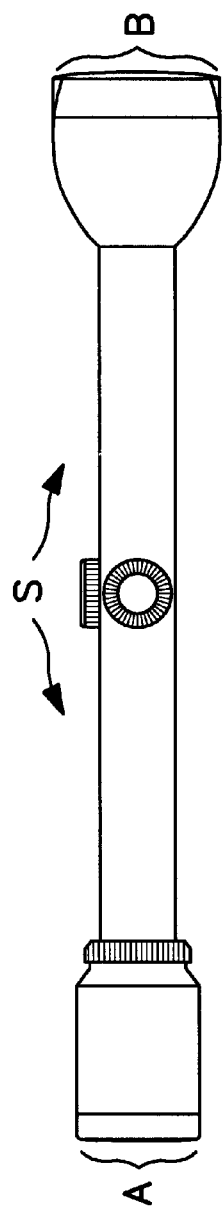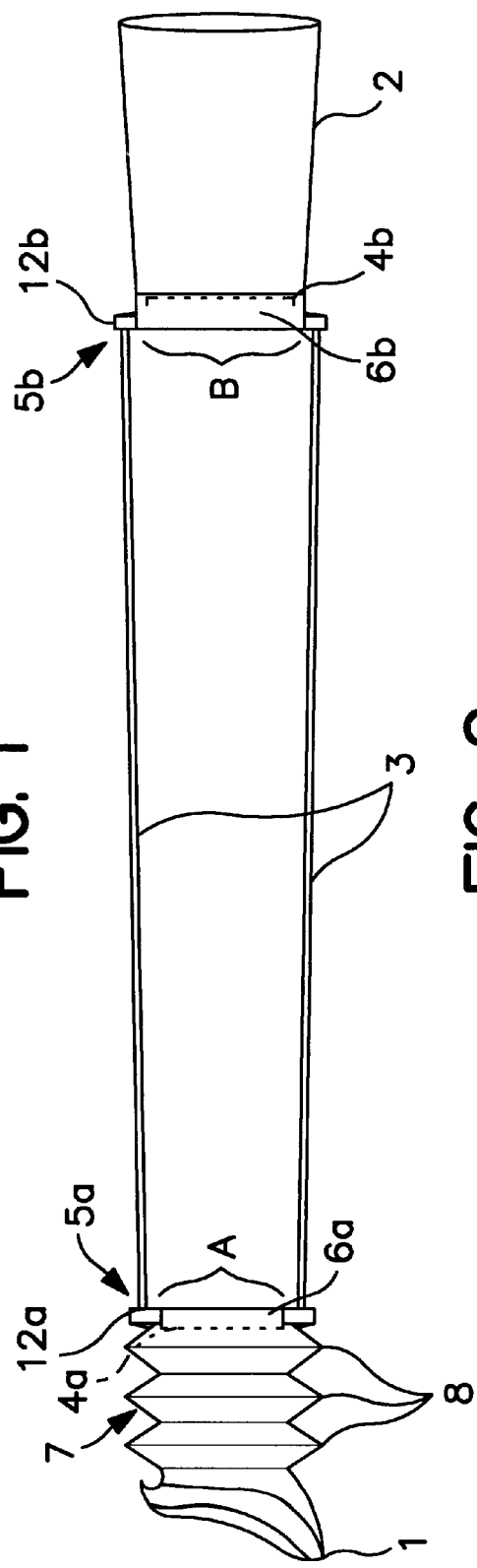

TELESCOPIC AIMING ENHANCER

BACKGROUND OF INVENTION

1. Field of Invention

This invention relates to a removable attachment for a telescopic sight, such as one mounted on a gun, for the purpose of enhancing the target during adverse lighting conditions.

2. Description of Prior Art

Numerous attachments have been previously suggested for employment with telescopic sights on guns. For example U.S. Pat. Nos. 2,696,672; 3,496,642; and 5,566,490 teach elastic bands or springs going the length of the rifle scope holding two protective covers together, which covers protect the exposed optical ends when the gun is not in use.

U.S. Pat. No. 2,968,099 discloses the use of flexible resilient sight protectors at both ends of the scope to protect the scope from the elements, while maintaining the sights always ready for action. The protectors include a drip ring for protection against rain.

U.S. Pat. Nos. D 234,539; 4,264,123; 5,506,727 and 6,000,667 disclose eyepieces attached to the rear, often called the ocular end or sighting end of the sight (i.e., the end closest to the eye when sighting). D 234,539 is directed to a particular design for a telescopic sight eye protector.

U.S. Pat. No. 4,264,123 discloses a removable fixed gun telescope extender, made of a soft rubber-like material, which fits on the ocular end, which extender may have a bellows type structure allowing for even compression and sideways tilt. The extender is purported to shut out all light interference without danger of impacting the eye. The telescopic extender is held in place by frictional means.

U.S. Pat. No. 5,506,727 discloses a device attached to the sighting end of a telescopic sight. The device is said to prevent light from entering into the space between the sighting end and the eye of the user. The eyepiece end of the device is angled forwardly toward the eye of the user. The device includes a flexible body with a recoil absorbing means and the device is held in place by frictional means.

U.S. Pat. No. 6,000,667 discloses an eyepiece as part of a particular mounting assembly for a telescopic sight oh a gun.

U.S. Pat. No. 4,089,117 discloses a removable sunshade which can be removably mounted on the variable end (i.e., the end opposite the eyepiece) of a telescope sight. The sunshade has a scope grasping collar at one end projecting forward to an arcuate forward edge and elongated side and the short side resulting in an elongated viewing slot in one side of the sunshade body.

U.S. Pat. No. 4,926,560 discloses a glare shade for a rifle scope that may be manually removably mounted and is comprised of extension section containing light admitting apertures. The shade is held in place by frictional means, similar to a hose clamp.

BRIEF SUMMARY OF THE INVENTION

The invention comprises a single device which comprises both an eye enhancer cover and a shade collector the two being connected to each other by two or more elastic band fasteners so it can be removably mounted on a sighting telescopic sight and can be easily stored when not in use. The object of the device is to optimize sighting of a target area under adverse lighting conditions with a single device.

BRIEF DESCRIPTION OF THE DRAWINGS

FIG. 1 is a top view of a typical sighting telescopic sight.

FIG. 2 is a perspective top view of the new device.

DETAILED DESCRIPTION OF THE INVENTION

A typical rifle telescopic sight S has an ocular end A and an objective end B each housing the proper lenses (not shown).

The user of such a sighting telescopic sight on a gun or rifle often misses his target because of adverse lighting conditions. For example, at dusk with the sun setting directly behind the user of the telescopic sight, the back-lighting creates a haze when sighting through the telescopic sight. Similarly, at sunup, with the sun in front of the user of the telescopic sight, the view of the target is severely diminished because of the glare of the sun. Often, there is not enough direct light to properly view the target through the telescopic sight because of an excess of indirect ambient light shutting out the direct light from the target. Other similar conditions may also be responsible for improper sighting of the target.

The present invention substantially solves such problems by having both an eye enhancer cover 1 and a shade/collector 2 being held in place on the telescopic sight S simultaneously by at least two elastic band fasteners 3 (two are illustrated) of sufficient strength to keep them firmly held in place. The device can be easily mounted by stretching the elastic bands and fitting it on the telescopic sight. Similarly, the device can be readily dismounted by stretching the elastic band fasteners 3 a bit and lifting off the device. The elastic band fasteners 3, when relaxed, remain attached to both the eye enhancer cover 1 and the shade/collector 2 keeping them together for easy storage.

Figure 3:
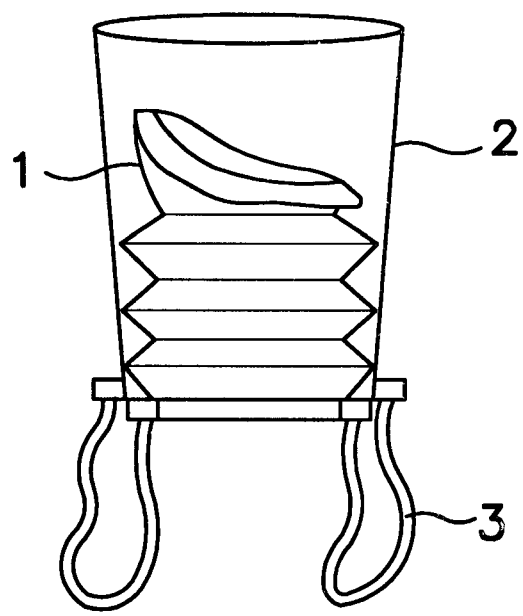
FIG. 3 is a perspective view illustrating how the eye enhancer cover of the present invention can be placed in the shade collector providing for protection and easy storage.

During storage, the eye enhancer cover 1 can be placed in the shade/collector 2 for convenience in storage and to prevent damage to the eye enhancer cover, as illustrated in FIG. 3.

To mount the device when needed, the elastic bands 3 are stretched to allow the components to slide over the ocular end A and the objective end B (the eye enhancer cover 1 over the ocular end A and the shade/collector 2 over the objective end B) of the telescopic sight.

The device is of a user friendly design to eliminate adverse lighting conditions at both ends of a telescopic sight, which is easily, quickly and quietly adaptable to any telescopic sight in the field for the purpose of acquiring the entire field of view through the telescopic sight. The design allows for quick mounting and dismounting. It can be mounted or dismounted in less than 10 seconds.

Figure 5:
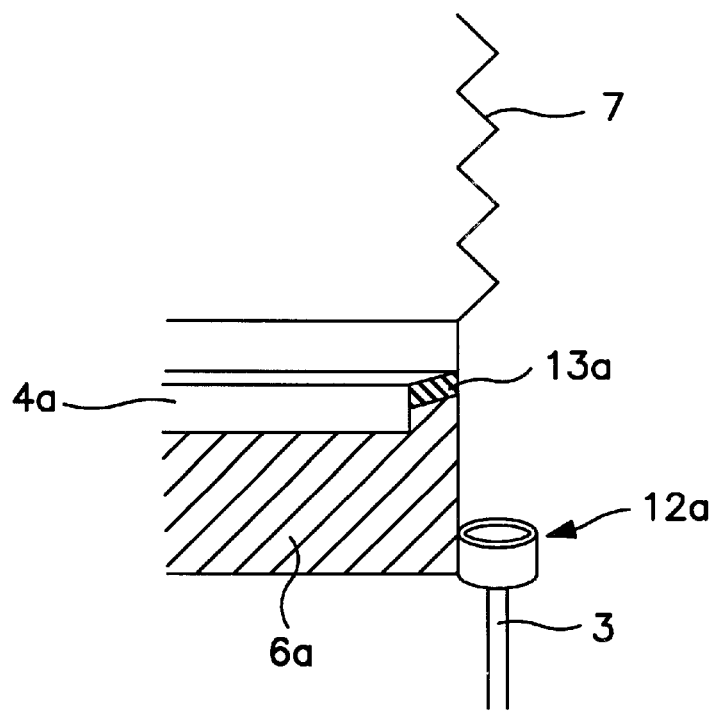
FIGS. 5 and 6 are sections through the eye enhancer cover detailing the construction of the base.
Figure 6:
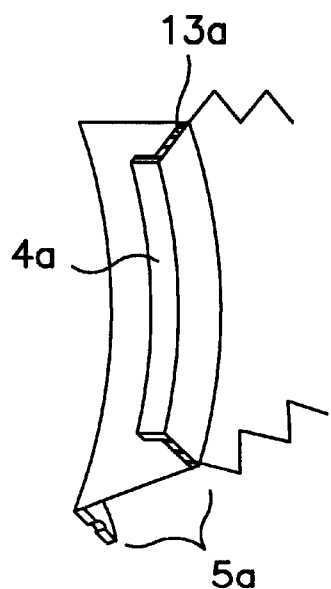
Figure 7:
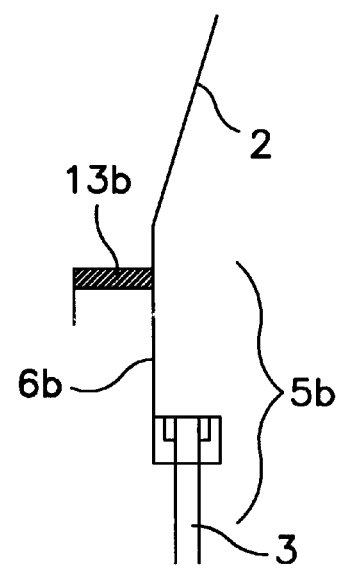
FIG. 7 is a section through the shade collector detailing the construction of the base.

Both the eye enhancer cover 1 and the shade/collector 2 are each illustrated as having a base or endcap 5a and 5b, respectively, including sidewalls 6a and 6b, respectively, and an internal stop lip 4a and 4b, respectively, fitting over the telescopic sight as indicated in FIGS. 5, 6 and 7. The elastic bands 3 are securely fixed to the sidewall of the bases, 5a and 5b in any convenient manner, such as with clips or a proper adhesive. The bands are preferably attached to bases via ears 12a and 12b molded as part of the respective bases. Preferably, the components of the new device slide over the ends of the telescopic sight with a minimum of two millimeters clearance of the sidewalls 6a and 6b of the base.

The elastic bands can be made of a stretchable material, such as a synthetic rubber. Alternatively, they can be of a coiled spring material or the like.

FIGS. 5, 6 and 7 show in more detail how the eye enhancer cover 1 and the shade/collector 2 are preferably designed for fitting to the telescopic sight. The stop lip 4a or 4b is molded continuous around the circumference of the base 5a or 5b, respectively and uses:minimal clearance. The stop lip will catch the inner circumference of the outer housing of either end of a telescopic sight. This will enable the two bases to stay aligned while in use.

As can be seen from the drawings, each stop lip forms a U-shaped channel with the remainder of the base for fitting over the telescopic sight. The bottom of each U-shaped shannel is preferably fitted with a soft rubber washer 13a and 13b. The rubber washers act as a cushion and prevent rotation during recoil.

The pressure exerted by the elastic bands 3 between the two pieces, 1 and 2, and the presence of the soft rubber washers keep both bases and their respective attachments (eye enhancer cover and shade/collector) in place through repeated recoil of firing the weapon.

The eye enhancer cover 1 is designed to eliminate substantially all back-light and ambient light by allowing the shooting eye to acquire a perfect seal at any specific eye relief distance as well as preventing injury from recoil effects. The illustrated eye enhancer cover 1 is right eye oriented. For use with the left eye, the bands can be stretched by pulling on the eye enhancer cover which needs merely be rotated about 180° or until in place with the alternate eye. The elastic bands will cross but will keep the shade/collector 2 in place. Of course, the entire device can be optionally designed for the left eye.

The eye enhancer cover barrel 7 is constructed of very soft and flexible plastic or rubber and is designed to compress at the slightest touch and spring back to keep a continuous light tight seal. Such materials are well known in the art and need not be discussed in detail. The barrel 7 of the illustrated eye enhancer cover of FIGS. 2 and 3 comprises recoil flex bands 8 arranged in an accordion-pleated shape to allow for variable eye distance and snug fit.

The preferred eye enhancer cover 1 of this invention is designed to fit most users. (Of course, it can be altered for any particular need.) For the purpose of this invention, the only structures of the human skull which are relatively the same size are the orbital bones which provide structure for the eye socket. The orbital bones of humans, from about the age of 12 years, can be measured, averaged and fitted with a single design. Designing the eye enhancer cover around the orbital bones provides for optimum blockage of light between the eye and telescopic sight. Prior art designs (e.g., U.S. Pat. No. 5,506,727) tend to rely on facial and nasal structure which tend to vary from person to person.

The shade/collector is made of a semi-rigid or flexible plastic, rubber or the like in a tubular or barrel shape, which sides slant at an angle outward from the objective end of the telescopic sight as is illustrated in FIGS. 1, 3 and 7, i.e., in the shape of the frustum of a cone. The optimum angle of the sides of the frustum can easily be readily determined. The sides may also have a curvature to them (not illustrated).

Figure 4:
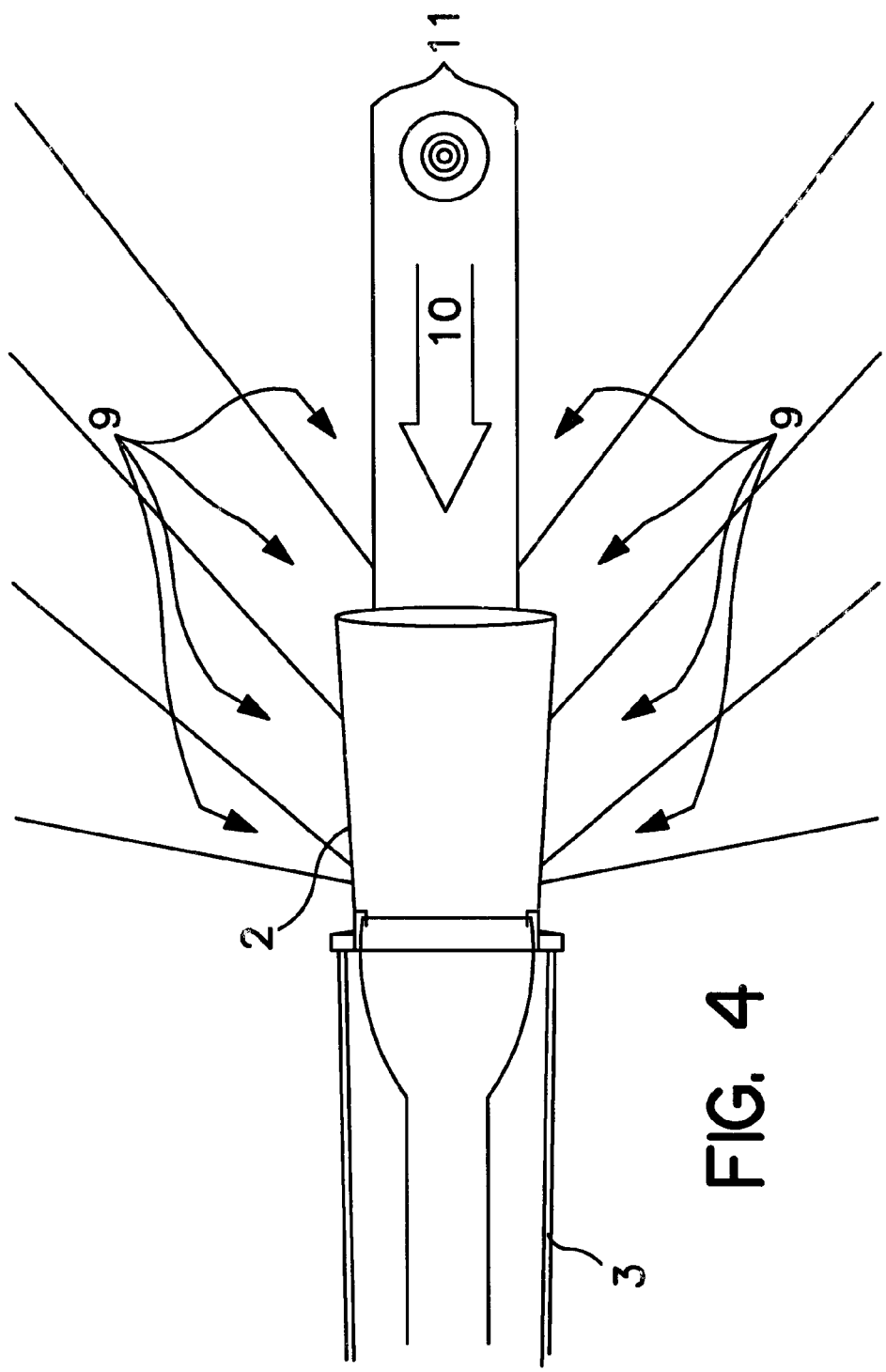
FIG. 4 is a top view of the objective end of the telescopic sight illustrating how the shade protector provides for an enhanced view of the target.

For the purpose; of this disclosure, "direct light" and "indirect light" are defined as follows. Direct light is the desirable light originating from the designated target area shown as arrow 10 in FIG. 4. Indirect light is defined as undesirable light rays that originate outside the designated target, shown by the arrows 9 in FIG. 4. The shade/collector 2 is designed to eliminate indirect light rays and actively collect direct light rays from the target 11 area which promotes a brighter clearer view of the target.

It is to be understood that the device of the invention is not usable only with telescopic sights of the type used on guns or rifles, but can be used with telescopic sights of the type used with transits, etc.

Though only particular forms of the device have been illustrated, various changes and modifications may be suggested to one skilled in the art. It is intended that the present invention encompass such changes and modifications as fall within the scope of the append claims.

I claim:

1. A device which can be temporarily mounted on a telescopic sight (S) for enhancing light coming from a target area (11), which device comprises an eye enhancer cover (1) for mounting on the ocular end of the telescopic sight for blockage of ambient light from the eye, and a shade/collector (2) for mounting on the objective end (B) of the telescopic sight, wherein said eye enhancer cover and said shade/collector are securely attached to each other by at least two elastic bands (3) which when stretched provide for ready mountability and dismountability of said eye enhancer cover and said shade/collector to said telescopic sight, and wherein the shade/collector (2) is of a frustum or barrel shape such that most of the indirect light (9) is excluded when sighting through the telescopic sight with the device mounted, providing for substantially optimum direct light (10) from the target area to the objective end (B) of the telescopic sight.

2. The device of claim 1 wherein each of the eye enhancer cover and the shade/collector have a base (5a, 5b) including sidewalls (6a, 6b), each base having an internal stop lip (4a, 4b) for fitting each of them to the telescopic sight.

3. The device of claim 1 wherein the shade/collector is of a conical shape angling outward from the objective end.

4. The device of claim 1 wherein the eye enhancer cover (1) includes a barrel (7), which barrel is constructed of soft and flexible plastic or rubber, designed to compress at the slightest touch and spring back to keep a continual light tight seal around a user's eye.

5. The device of claim 4, wherein the barrel of the eye enhancer cover comprises recoil flex bands (8) arranged in an accordion-pleated shape to allow for variable eye distance and snug fit.

6. The device of claim 1, wherein the eye enhancer cover is designed to fit snugly around human orbital bones to provide for optimum blockage of light between a user's eye and telescopic sight.

* * * * *